United States Patent
Lakkis et al.

(10) Patent No.: US 6,359,878 B1
(45) Date of Patent: Mar. 19, 2002

(54) NON-DATA-AIDED MAXIMUM LIKELIHOOD BASED FEEDFORWARD TIMING SYNCHRONIZATION METHOD

(75) Inventors: Ismail Lakkis; Deirdre O'Shea; Masood K. Tayebi; Baya Hatim, all of San Diego, CA (US)

(73) Assignee: Wirless Facilities, Inc., San Diego, CA (US)

( * ) Notice: Subject to any disclaimer, the term of this patent is extended or adjusted under 35 U.S.C. 154(b) by 0 days.

(21) Appl. No.: 09/119,327

(22) Filed: Jul. 20, 1998

(51) Int. Cl.$^7$ .............................. H04J 3/06; H04L 7/00
(52) U.S. Cl. ....................... 370/350; 370/342; 375/355
(58) Field of Search ................................ 370/210, 342, 370/343, 345, 350; 375/262, 324, 343, 354, 355

(56) References Cited

U.S. PATENT DOCUMENTS

| | | | |
|---|---|---|---|
| 3,943,346 A | 3/1976 | Urkowitz et al. | 235/152 |
| 4,020,332 A | 4/1977 | Crochiere et al. | 235/152 |

(List continued on next page.)

FOREIGN PATENT DOCUMENTS

| | | |
|---|---|---|
| GB | 2 213 025 A | 8/1989 |
| GB | 2 286 949 A | 8/1995 |

OTHER PUBLICATIONS

Panayirci, E. and Bar–Ness, E. Y., IEEE Transactions on Communications, vol. 44, No. 1, pp. 29–33, Jan. 1996 "A New Approach for Evaluating the Performance of a Symbol Timing Recovery System Employing a General Type of Nonlinearity".

Proakis, J. G., Digital Communications, Third Edition, Chp. 6, McGraw–Hill Publishers, pp. 333–373, and pp. 536–537 "Carrier and Symbol Synchronization".

(List continued on next page.)

*Primary Examiner*—Hassan Kizou
*Assistant Examiner*—Ahmed Elallam
(74) *Attorney, Agent, or Firm*—Knobbe, Martens, Olson & Bear, LLP (57) ABSTRACT

A system and method of timing estimation for use in a digital receiver within a communication system. A timing estimation block is provided within a digital receiver, where the input signal is processed at four or more samples per symbol and the estimation block operates in a feedforward manner. The algorithm calculates the timing offset by evaluating the spectral component at the symbol clock frequency. The spectral component is generated using a nonlinearity operation. However, the maximum likelihood non-data-aided timing estimation equation reveals an alternative approximation for the logarithm of the hyperbolic cosine function present in the maximum likelihood equation, which offers an excellent compromise between implementation complexity and variance performance. The estimated timing offset is then fed to a timing correction unit, which calculates the data samples corresponding to the sampling clock phase and removes the redundant samples. The ideal sampled signal is then forwarded to additional synchronization and functional units for further processing. This method is provided for a variety of digital receivers employing Code Division Multiple Access (CDMA), Time Division Multiple Access (TDMA), Frequency Division Multiple Access (FDMA) and or any combination of the principles of the above or other technologies. In accordance with one embodiment of the invention, a digital receiver system comprises an anti-aliasing filter, a sampling unit, a filtering block, a timing estimation block, a timing correction block and additional synchronization and functional units block.

4 Claims, 8 Drawing Sheets

U.S. PATENT DOCUMENTS

| | | | | |
|---|---|---|---|---|
| 4,471,480 A | | 9/1984 | Haussmann et al. | |
| 4,866,647 A | | 9/1989 | Farrow | |
| 5,285,480 A | * | 2/1994 | Chennakeshu et al. | 375/348 |
| 5,361,276 A | | 11/1994 | Subramanian | |
| 5,541,965 A | | 7/1996 | Daffara | 375/326 |
| 5,555,247 A | | 9/1996 | Matsuoka et al. | |
| 5,802,117 A | * | 9/1998 | Ghosh | 375/267 |
| 5,805,619 A | * | 9/1998 | Gardner et al. | 714/814 |
| 5,854,570 A | * | 12/1998 | Schmidt | 329/304 |
| 5,933,467 A | * | 8/1999 | Sehier et al. | 375/350 |
| 6,002,729 A | * | 12/1999 | Schmidt | 375/364 |
| 6,134,286 A | * | 10/2000 | Chennakeshu et al. | 375/365 |
| 6,175,600 B1 | * | 1/2001 | Guillemain et al. | 375/326 |

OTHER PUBLICATIONS

Vesma, J., Renfors, M and Rinne, J., IEEE GlobeCom 1996 "Comparison of Efficient Interpolation Techniques for Symbol Timing Recovery".

Zhang, P., Short, R. T. and Chen, X. X., IEEE GlobeCom 1996 "Fast Timing Estimation for CDMA Waveforms in a Near–Far Environment".

Meyr, H., Moeneclaey, M and Fechtel, S.A., Digital Communication Receivers: Synchronization, Channel Estimation and Signal Processing, Proakis, J., John Wiley Publishers., pp. 289–295, 1998 "NDA Timing Parameter Estimation by Spectral Estimation".

Moeneclaey, M. and Bucket, K., Signal Processing in Telecommunications, pp. 171–182, Sep. 1995, "Timing Correction by Means of Digital Interpolation".

Morelli, M., D'Andrea A. N. and Mengali, U., IEEE Communications Letters, vol. 1, No. 3, pp. 80–82, May 1997 "Feedforward ML–Based Timing Estimation with PSK Signals".

Oerder, M. and Meyr, H., IEEE Transactions on Communications, vol. 36, No. 5, pp. 605–611, May 1988 "Digital Filter and Square Timing Recovery".

Gardner, F.M., IEEE Transaction on Communications, vol. 34, No. 5, pp. 423–429, May 1986 "A BPSK/QPSK Timing–Error Detector for Sampled Receivers".

Lambrette, U., Langhammer, K. and Meyr, H., IEEE GlobeCom 1996 "Variable Sample Rate Digital Feedback NDA Timing Synchronization".

Mengali, U. and D'Andrea, A., Synchronization Techniques for Digital Receivers, p. 398, 1998 "Feedforward Estimation Schemes".

Meyers, M. H. and Franks, L. E., IEEE Transactions on Communications. vol.28, No. 8, pp. 1121–1129, Aug. 1980 "Joint Carrier Phase and Symbol Timing Recovery for PAM Systems".

Classen, F., Meyr, H., and Sehier, P., Proc. of VTC '93, pp. 738–741, Secausus, NJ, May 18, 1993 "An all Feedforward Synchronization Unit for Digital Radio".

De Gaudenzi, R., Luise, M. and Viola, R., IEEE Transactions on Communications, vol. 41, No. 11, pp. 1760–1769, Nov. 1993 "A Digital Chip Timing Recovery Loop for Band–Limited Direct–Sequence Spread–Spectrum Signals".

Erup, L., Gardner, F. M. and Harris, R.A., IEEE Transactions on Communications, vol. 41, No. 6, pp. 998–1008, Jun. 1993 "Interpolation in Digital Modems–Part II: Implementation and Performance".

Gardner, F.M., IEEE Transactions on Communications, vol. 41, No. 3, pp. 501–507, Mar. 1993 "Interpolation in Digital Modems–Part 1: Fundamentals".

* cited by examiner

NON-DATA-AIDED MAXIMUM LIKELIHOOD BASED FEEDFORWARD TIMING SYNCHRONIZATION METHOD

BACKGROUND OF THE INVENTION

1. Field of Invention

The invention relates to communication systems, and more particularly to an apparatus for achieving synchronization in digital receivers used in communication systems.

2. Description of the Related Technology

In synchronous digital transmission, information is conveyed by uniformly spaced pulses and the function of any receiver is to isolate these pulses as accurately as possible. However, due to the noisy nature of the transmission channel, the received signal has undergone changes during transmission and a complete estimation of certain reference parameters is necessary prior to data detection. Estimation theory proposes various techniques for estimating these parameters depending on what is known of their characteristics. One such technique is called maximum likelihood (ML). Maximum likelihood estimation assumes the parameters are deterministic or at most slowly varying over the time interval of interest. The term deterministic implies the parameters are unknown but of a constant value and are, therefore not changing over the observation interval. These unknown parameters can cover such factors as the optimum sampling or the phase offset introduced in the channel or induced by the instabilities of the transmitter and receiver oscillators. It is widely recognized that maximum likelihood estimation techniques offer a systematic and conceptually simple guide to the solution of synchronization problems. Maximum likelihood offers two significant advantages: it leads to appropriate circuit configurations and provides near optimum or optimum performance depending on the known channel conditions. See, e.g., J. G. Proakis, "*Digital Communications*", Third Edition, McGraw-Hill Publishers, 1995, pp. 333–336.

Maximum likelihood parameter estimation for communication systems facilitates two forms of processing depending on how the data present on the received signal is exploited to assist in parameter estimation. The first is data-aided (DA) estimation wherein known data within the received data stream is exploited to improve the estimation performance. Alternatively, non-data-aided (NDA) estimation is possible wherein the random data is considered a nuisance parameter, which is removed by averaging the received signal over the statistics of the random data. Applying ML as the criterion to derive the NDA ML timing offset estimator, results in a mathematical expression, which is highly non-linear and totally impractical to implement (i.e., the solution requires calculating the natural logarithm of a hyperbolic cosine function of the received signal samples). However, the ML based timing estimators available in the literature are derived by making suitable approximations for the natural logarithm of the hyperbolic cosine non-linearity for extreme values of signal to noise conditions, which generally yield acceptable performance over a wide range of signal to noise conditions. The variance of the timing estimate depends on the applied approximation. In the present invention, an approximation is applied, which offers an excellent compromise between variance performed and implementation cost for the NDA estimation of a timing offset where a phase offset is present on the received signal.

Generally, if the transmitter does not generate a pilot synchronization signal, the receiver must derive symbol timing from the received signal. The term symbol is used in this context to refer to transmitted signals that are phase and or amplitude modulated with discrete phase and or amplitude relationships; each assigned relationship is a symbol that is subject to detection at the receiver. Both the transmitter and receiver employ separate clocks which drift relative to each other, and any symbol synchronization technique must be able to track such drift. Therefore, choosing the proper sampling instants for reliable data detection is critical, and failure to sample at the correct instants leads to inter-symbol interference (ISI), which can be especially severe in sharply bandlimited signals. The term ISI refers to two or more symbols that are superimposed upon each other. Under these circumstances, phase detection of each symbol becomes extremely difficult. Incorrect sampling implies the receiver is inadvertently sampling where the influence of the previous data symbol is still present. See, e.g., J. G. Proakis, "*Digital Communications*", Third Edition, McGraw-Hill Publishers, 1995, pp. 536–537.

Figure 1A:
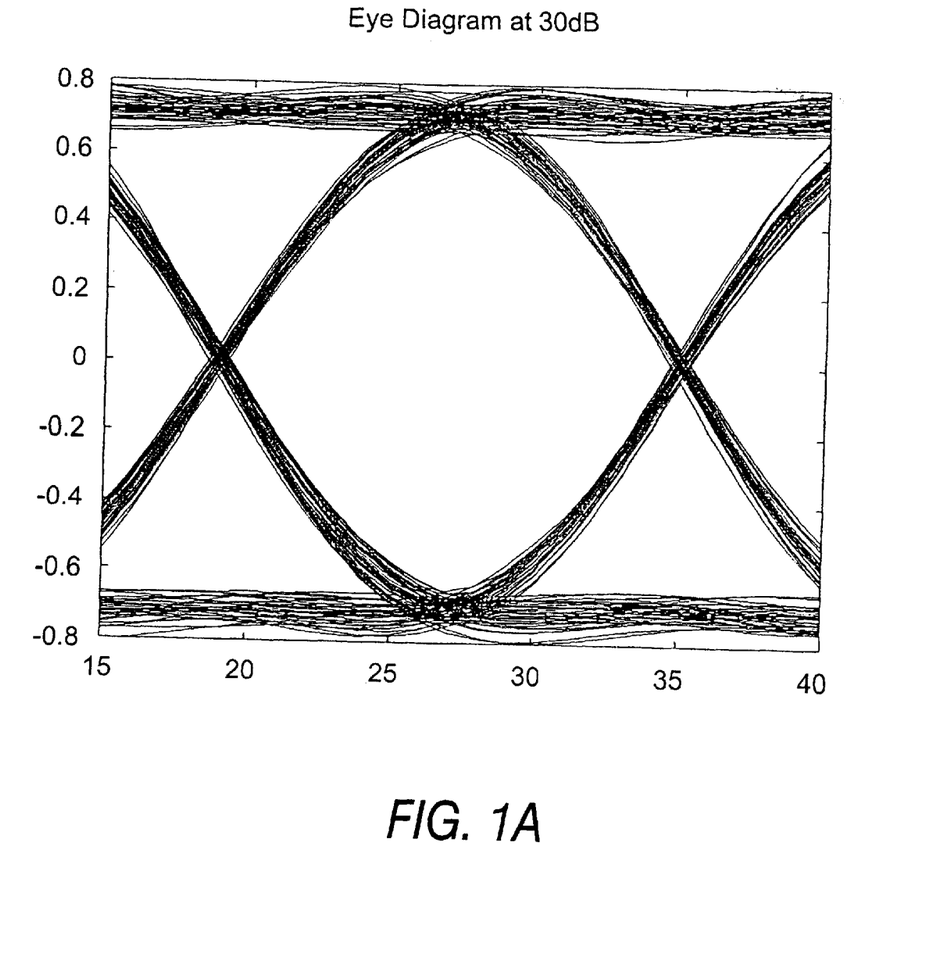
FIGS. 1a and 1b illustrates the formation of an eye diagram at the output of the pulse shaping filter for high and low signal to noise conditions.
Figure 1B:
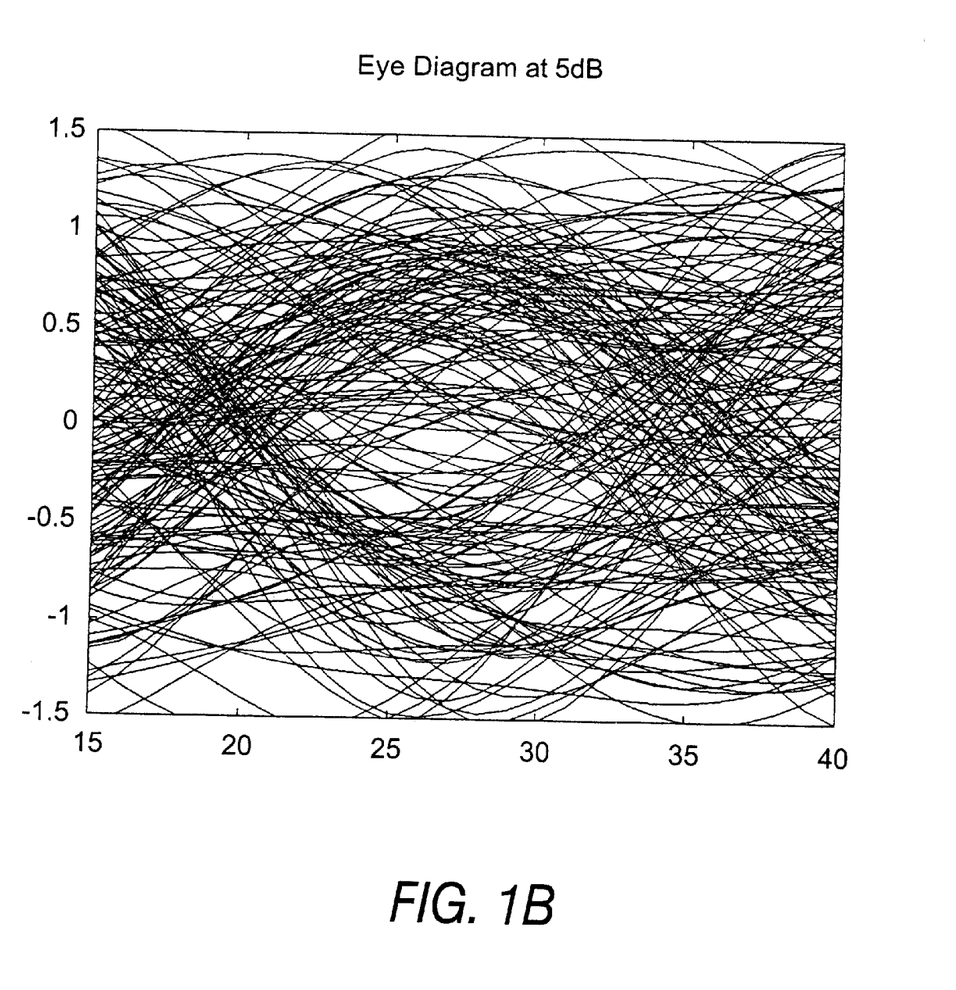
Figure 2:
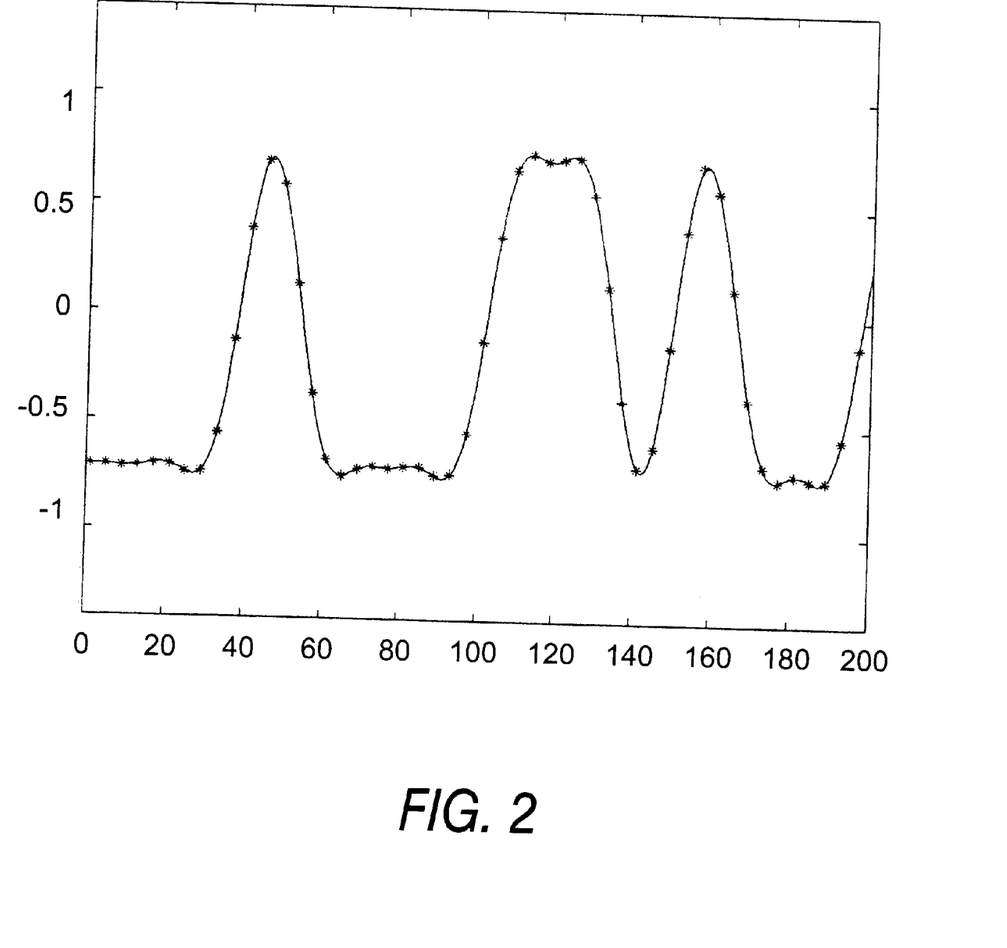
FIG. 2 illustrates the difference between an analog signal and its counterpart sampled signal at four samples per symbol.

In a digital receiver, the signal following demodulation is first passed through an anti-aliasing filter which is used to limit the bandwidth of the received signal, and is subsequently sampled asynchronously. Asynchronous sampling implies there is no control over the instant at which the sampling of the continuous time signal occurs. FIG. 2 illustrates the concept of oversampling a continuous signal at four samples per symbol. The optimum sampling instants correspond to the maximum eye opening and are located approximately at the peaks of the signal pulses. The term "eye opening" refers to the amplitude variations of the signal at the output of the pulse-shaping filter. An "eye" is formed by superimposing the output of the pulse shaping filter for each symbol upon the other until the central portion takes on the shape of an "eye" as illustrated in FIGS. 1*a* and 1*b* for the case of a BPSK (Binary Phase Shift Keying) modulation scheme. Note that under high signal-to-noise conditions, the "eye" is open whereas at low signal to noise conditions the "eye" is closed.

Figure 3:
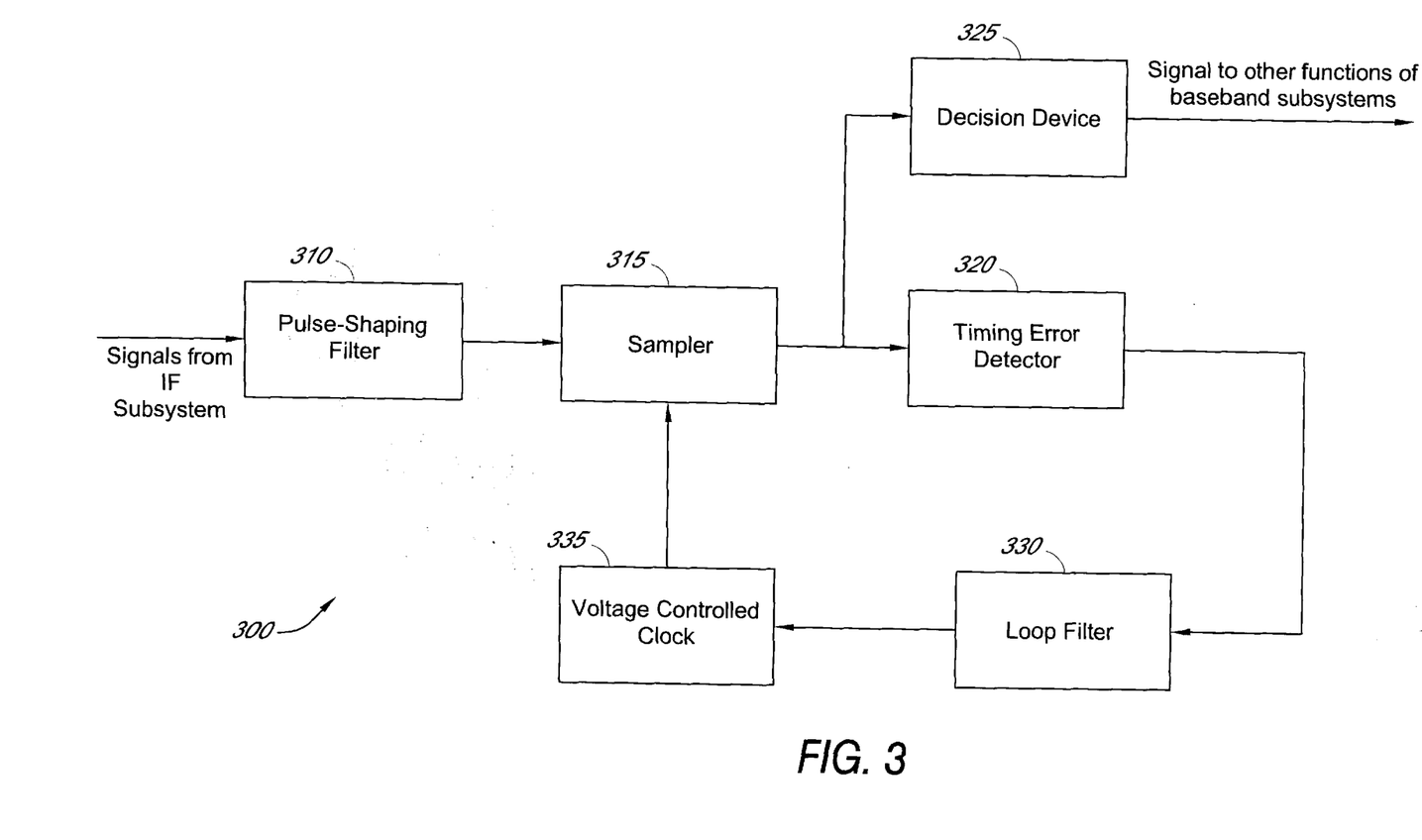
FIG. 3 shows a feedback estimator configuration.
Figure 4:
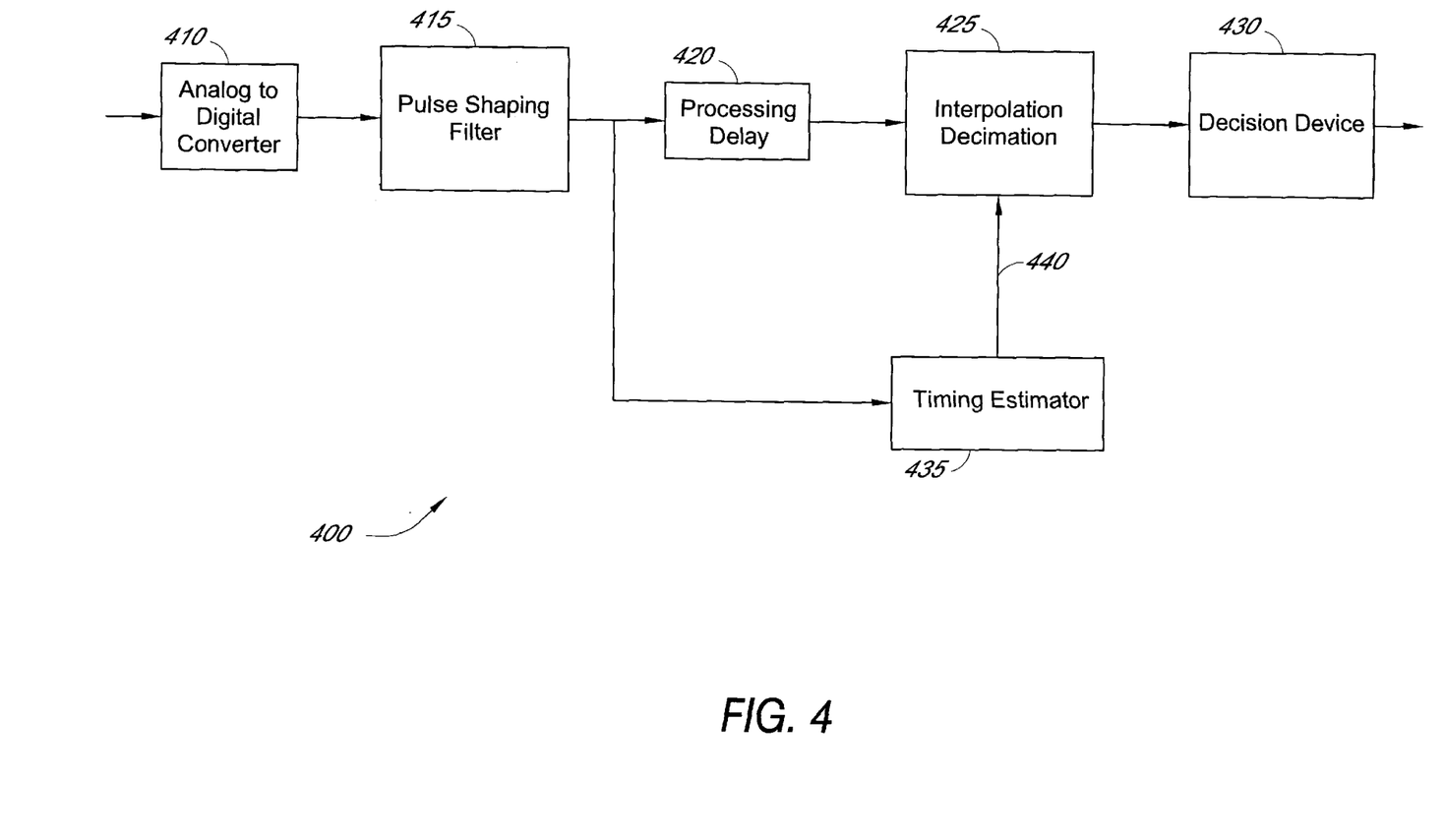
FIG. 4 illustrates a feedforward estimator configuration.

Among synchronization techniques, a distinction is made between feedforward and feedback systems. A feedback system uses the signal available at the system output to update future parameter estimates. Feedforward systems process the received signal to generate the desired estimate without explicit use of the system output. Whether the design approach is feedforward or feedback, both techniques are related to the maximum likelihood parameter estimation. In an error tracking feedback loop, the timing estimator constantly adjusts the phase of a local clock oscillator to minimize the phase error between the estimated and the optimum sampling instant as illustrated in FIG. 3 The principle is the same for continuous time or sampled input signals Feedforward designs however are applied to sampled input signals. A feedforward timing loop as illustrated in FIG. 4, initially samples the incoming signal, and then using techniques such as interpolation/decimation estimates the ideal sample and removes the redundant samples. Both feedforward and feedback techniques are used in the current technology. However, it should be noted that there are advantages and disadvantages associated with both approaches, which should be understood prior to deciding the appropriate estimator configuration for a particular design.

Problems with feedback techniques include the acquisition time, the high probability of hangup and cycle slips associated with their phase locked loop (PLL) based structures, especially in the presence of fading. Fading occurs when signal components arriving via different propagation paths add destructively. Hangup occurs when the initial phase error of the estimator is close to an unstable equilibrium point, which can result in an extremely long acquisition time (i.e., a long time for the loop to adjust to the correct phase), in fact, the loop may never recover. Hangup is very serious as it can even occur in perfect channel conditions. See, e.g., H. Meyr, M. Moeneclaey and S. A. Fechtel, "*Digital Communication Receivers: Synchronization, Channel Estimation and Signal Processing*", John Wiley Publishers, 1998, pp.94–97. Cycle slips are very harmful to the reliability of the receiver's decisions, because a cycle slip corresponds to the repetition or omission of a channel symbol. H. Meyr, M. Moeneclaey and S. A. Fechtel, "*Digital Communication Receivers: Synchronization, Channel Estimation and Signal Processing*", John Wiley Publishers, 1998, pp.385–399. These issues are solely due to the feedback nature of traditional estimators.

These problems can be circumvented through the use of feedforward estimation. The advantages of feedforward estimation are that acquisition time is solely dependent on loop bandwidth and is not influenced by channel conditions, cycle slipping and hangup do not occur and implementation costs are lower, as feedforward designs are more suited to VLSI (Very Large Scale Integration) implementation. Flexibility in the design of the synchronization unit in a receiver has increased in recent times with the advent of increasingly powerful semiconductor integrated circuits. This has led to the increasing adoption of feedforward estimation techniques and the further development of novel synchronization techniques.

However, feedforward techniques, require a higher oversampling ratio than is prevalent in sampled feedback estimators, see, e.g., F. M. Gardner, "A BPSK/QPSK Timing Error Detector for Sampled Receivers", IEEE Transactions on Communications, COM-44, March 1996, pp399–406; K. H. Mueller and M. Mueller, "Timing Recovery in Digital Synchronous Data Receivers", IEEE Transactions on Communications, COM-24, May 1976, pp516–531, which generally require an oversampling rate of one or two samples per symbol for reliable operation. In feedforward designs the oversampling rate is generally four or more samples per symbol. See, e.g., H. Meyr, M. Moeneclaey and S. A. Fechtel, "*Digital Communication Receivers: Synchronization, Channel Estimation and Signal Processing*", John Wiley Publishers, 1998, pp.289–295. This is in contrast to classic analog feedback methods, which require a continuous time waveform. See, e.g., J. G. Proakis, "*Digital Communications*", Third Edition, McGraw-Hill Publishers, 1995, pp.358–365. Digital synchronization methods recover timing, by operating only on signal samples taken at a suitable rate. Digital implementation of an estimator has enormous appeal in communications technology and influences the design of all modern receivers because of the flexibility and accuracy of the signal processing algorithms.

There are two distinct stages involved in timing estimation: first the estimation of the timing phase and second the application of this estimate to the sampling process. The choice of ideal sampling instant within the symbol duration is called the timing phase. In a feedback system these are integrated together into one loop, as illustrated in FIG. 3, whereas in feedforward estimation they comprise two very distinct stages in the receiver as illustrated in FIG. 4. The configuration of the feedforward timing estimator loop is very different from that of a feedback loop. FIG. 4 illustrates that the first stage is the asynchronous sampling. In the feedforward arrangement, sampling is typically not directly synchronized to the data symbols and the subsequent processing must choose the optimum sampling instant without the luxury of altering the phase of the sampling clock. This is achieved in the timing phase estimation and timing correction units. An algorithm is applied in the timing phase estimation unit to estimate the timing phase. The final stage of signal synchronization is the timing correction, which is the interpolator/decimator. Interpolation estimates the signal value at the optimum sampling instant using the timing phase from the timing phase estimation unit. See, e.g., H. Meyr, M. Moeneclaey and S. A. Fechtel, "*Digital Communication Receivers: Synchronization, Channel Estimation and Signal Processing*", John Wiley Publishers, Chapter 9, 1998, pp.505–532. Furthermore, to remove the redundant sampling instants produced by the asynchronous sampling of the received signal, a decimator follows the interpolator. The interpolator is essentially a rate conversion mechanism whereby the signals at the input and output operate at two distinct, yet unrelated sampling rates.

The received noisy signal contains no periodic components because the information symbols have zero mean. However, if the received signal is passed through an appropriate nonlinearity operation, such as the square law nonlinearity, spectral lines are generated in the frequency domain at multiples of the symbol rate as illustrated in FIG. 5*b*. Exploitation of this and similar nonlinearities in the current technology have been presented in the literature. See, e.g., H. Meyr, M. Moeneclaey and S. A. Fechtel, "*Digital Communication Receivers: Synchronization, Channel Estimation and Signal Processing*", John Wiley Publishers, 1998, pp.289–295; M. Morelli, A. N. D'Andrea and U. Mengali, "Feedforward ML-Based Timing Estimation with PSK Signals," IEEE Communications Letters, Vol. 1, No. 3, 1997, pp80–82; E. Panayirci and E. Y. Bar-Ness, "A New Approach for Evaluating the Performance of a Symbol Timing Recovery System Employing a General Type of Nonlinearity", IEEE Transactions on Communications, Vol. 44, No. 1, 1996, pp.29–33. The concepts of the frequency and time domain are well known. The class of timing estimators which utilize a nonlinearity of this nature are known as spectral line generating synchronizers. The resulting signal at the output of the nonlinearity is the sum of a periodic signal with period equal to the symbol rate T. This periodic signal can be composed as the sum of sinusoidal components with frequencies 1/T, and multiples thereof. This corresponds to spectral lines at the same frequencies The signal at the output of the nonlinearity enters either a phase locked loop (PLL), or a narrowband bandpass filter. In the case of a narrowband bandpass filter tuned to the channel symbol rate 1/T, the sinusoidal component at frequency 1/T, present at the output of the nonlinearity, is isolated.

Practical timing estimators can never perfectly duplicate the effects of the transmitter clock and the transmission channel. However, a fundamental requirement of any timing estimator is that the average frequency of the transmitter and receiver clock oscillators be identical although an instantaneous phase offset always exists. Timing jitter is a term used to account for the fluctuations between the actual clock phase and the optimum clock phase at the receiver to ensure optimum sampling. The timing offset estimate comprises the ideal timing offset as well as fluctuations due to noise, i.e., timing jitter. The smaller the timing jitter the better the timing estimator. In fact, timing jitter is one of the most important criteria in the selection and analysis of a timing estimator. Timing jitter however, is not a fundamental impairment and can be reduced by improving the estimator design. Therefore, the variance of the timing estimate is critical in the analysis of any estimator. The effect of timing jitter is to increase the amount of ISI present on the decimated output data stream.

There is an alternative to the use of a PLL or a narrowband bandpass filter to isolate the spectral component at the symbol rate. This involves evaluating the Fourier component of the signal samples at the output of the nonlinearity for the spectral line occurring at the symbol rate. The phase of the spectral line at the symbol rate is related to the normalized timing offset. The accuracy of this technique depends on the observation interval over which the Fourier component is evaluated. As the observation interval increases, the jitter reduces. However, rather than increasing the observation interval, the jitter performance can also be improved by using alternative nonlinearities. See e.g., M. Morelli, A. N. D'Andrea and U. Mengali, "Feedforward ML-Based Timing Estimation with PSK Signals," IEEE Communications Letters, Vol. 1, No. 3, 1997, pp80–82; E. Panayirci and E. Y. Bar-Ness, "A New Approach for Evaluating the Performance of a Symbol Timing Recovery System Employing a General Type of Nonlinearity", IEEE Transactions on Communications, Vol. 44, No.1, 1996, pp.29–33.

ML theory states that joint estimation of all the unknown parameters in a system is the optimal approach for detecting data in white noise. However, joint estimation is not always used, due to issues related to the interdependence of the estimation of all parameters simultaneously. In practice, independent estimation of the parameters is preferred. However, care must be taken in the choice of parameter estimators for a receiver. If the timing estimator is among the first units in the baseband receiver system, then its performance should be independent of the presence of a phase offset on the sampled received signal which is deterministic or at most slowly varying over the observation interval. In general, a phase offset is considered to be slowly varying if its phase changes by less than $10^{-3}$ over the observation interval. To date, in the literature few timing estimators can meet this challenge.

Consequently, what is desired is to provide a timing estimation method which can give comparable performance in the presence of a slowly varying or static phase offset as algorithms which require that the phase offset be removed beforehand. Timing estimation based on the information obtained from the sampled pulse shaping output in a digital receiver using four samples per symbol is also needed. A mechanism for timing estimation when knowledge of the data stream or subsection of the data stream (i.e., a training sequence) can not be used to assist in the estimation is also needed. An alternative method of timing estimation, which provides improved jitter performance over the square law nonlinearity spectral line estimator established in the literature, see, e.g., H. Meyr, M. Moeneclaey and S. A. Fechtel, "Digital Communication Receivers: Synchronization, Channel Estimation and Signal Processing", John Wiley Publishers, 1998, pp.289–295, without compromising the relative ease of implementation associated with a square law non-linearity is also needed.

SUMMARY OF THE INVENTION

The present invention provides a system and method of timing estimation for use in a digital receiver within a communication system. A timing estimation block is provided within a digital receiver, where the input signal is processed at four or more samples per symbol and the estimation block is feedforward.

The algorithm calculates the timing offset by evaluating the spectral component at the symbol clock frequency. The spectral component is generated using a nonlinearity operation. The maximum likelihood derivation of a NDA timing estimator indicates an alternative approximation for the logarithm of the hyperbolic cosine function present in the maximum likelihood equation. The estimated timing offset is then fed to a timing correction unit, which calculates the data samples corresponding to the sampling clock phase and removes the redundant samples. The ideal sampled signal is then forwarded to additional synchronization and functional units for further processing.

This method is provided for a variety of digital receivers employing Code Division Multiple Access (CDMA), in which a transmitted signal is spread over a band of frequencies much wider than the minimum bandwidth required to transmit the signal; Time Division Multiple Access (TDMA), where the users share the radio spectrum in the time domain; Frequency Division Multiple Access (FDMA) where a user is allocated at least one unique frequency for communication without interference with users in the same frequency spectrum and or any combination of the principles of the above or other technologies.

In one aspect of the present invention, a digital receiver system comprises an anti-aliasing filter, a sampling unit, a filtering block, a timing estimation block, a timing correction block and additional synchronization and functional units block. The filtering block comprises a pulse-shaping filter. The timing estimation subsystem comprises a magnitude squaring law nonlinearity, a square law non-linearity, a scaler gain block, a subtraction operation, a complex multiplication operation, a read only memory (ROM) to store the exponential coefficients, an accumulator and a phase calculator lookup table. The filtering block receives the input signal from an intermediate frequency (IF) block which has been demodulated to baseband. In one embodiment, this signal is fed to an anti-aliasing filter to limit the bandwidth of the received signal and then sampled at the analog-to-digital converter (ADC) with a fixed clock (Sampling Clock =46.7 MHz). Note that the signals received by the filtering block within the digital receiver might not be sampled, and that the sampling may take place only after the filtering block. The signals output from the filtering block are then fed to the timing estimation subsystem for further processing. The resulting timing estimate is then fed to the timing correction unit to correctly estimate the received data stream. The output from the timing correction unit is subsequently fed to additional functional blocks for further processing.

Another aspect of the invention includes a timing estimation circuit, comprising an instantaneous likelihood function circuit capable of approximating the natural logarithm of the hyperbolic cosine of a sampled filtered signal; a multiplier receivably connected to the approximation circuit and receivably connected to a source for exponential coefficients and outputting sampled Fourier components; a summer receivable connected to the multiplier for summing each sampled Fourier component; and a phase calculator receivable connected to the summer to provide a timing offset signal.

Yet another aspect of the invention includes a timing synchronization circuit for a baseband subsystem of a digital receiver, comprising a delay circuit receiving a sampled filtered signal; a timing estimation circuit receiving the sampled filtered signal and including a natural logarithm of the hyperbolic cosine approximation circuit; and a timing correction circuit receivably connected to the delay circuit and the timing estimation circuit.

Still another aspect of the invention includes an instantaneous likelihood function circuit, comprising means for magnitude squaring a sampled filtered signal; means, receivably connected to the magnitude squaring means, for scaling the magnitude squared signal; means, receivably connected to the magnitude squaring means, for squaring the magnitude squared signal; and a subtracter to subtract the signals received from the squaring means and the scaling means.

DETAILED DESCRIPTION OF THE DRAWINGS

The above and other aspects, features and advantages of the invention will be better understood by referring to the following detailed description of the preferred embodiment, which should be read in conjunction with the accompanying drawings.

A detailed description of the invention is provided below. As a particular embodiment of the invention, the following description is not intended to limit the enumerated claims, but to serve as a particular example thereof.

FIGS. 1a and 1b illustrate the concept of an eye opening at high (30 dB) and low (5 dB) signal to noise ratios respectively. Superimposing portions of a signal, equivalent to the duration of one or more symbols, onto itself forms an eye. At high signal-to-noise conditions there are few fluctuations on the signal so the central portion of the superimposed signal remains clear and tends to form the outline of an eye. This is illustrated in FIG. 1a at 30 dB. FIG. 1b illustrates how the eye closes at lower signal to noise conditions due to fluctuations of the amplitude of the signal.

FIG. 2 illustrates the difference between a continuous time and discrete time representation of a signal for the case of taking four samples per symbol. Analog receivers use the continuous time representation of the received signal to assist in the estimation process. The challenge to digital receivers is to provide the same performance as analog receivers.

FIG. 3 shows a block diagram of a feedback timing estimator 300. The feedback timing estimator 300 comprises a pulse-shaping filter block 310, a sampler block 315, a timing error detector block 320, a decision device 325, a loop filter 330 and a voltage controlled clock (VCC) 335. The pulse-shaping filter 310 is an analog component receiving a signal from an antenna. The phase of the sampler block 315 is controlled by the VCC 335. The sampling rate of the VCC 335 with respect to the data rate depends on the algorithm used in the timing error detector block 320. Typically, for feedback timing estimators, the rate of the VCC 335 is two samples per symbol although a one sample per symbol algorithm for the timing error detector 320 also exists. The VCC 335 synchronously samples the received signal. The sampled received signal at the output of the sampler block 315 is fed to the timing error detector block 320, which produces an instantaneous error signal based on the input samples. The output of the timing error detector block 320, an error signal, is fed to the loop filter 330. The loop filter 330 averages over the instantaneous error signals received from the timing error detector 320 to produce a smoothed error response. The length of the averaging interval (i.e. the observation interval) in the loop filter is inversely proportional to the loop filter bandwidth. In the presence of noise, the accuracy of the instantaneous timing offset is subject to the noise levels present on the received signal (as indicated by the signal-to-noise ratio (SNR). In high SNR conditions, an instantaneous estimate is more accurate than an estimate at low SNR conditions. However, under realistic conditions, where noise is present on the received signal, it is necessary to average over the instantaneous timing estimate to improve the reliability of the timing estimate and reduce the effect of noise variance. This is the purpose of the loop filter 330. The longer the averaging interval, the more accurate is the timing estimate. This averaged error signal is fed to the VCC 335. The decision device 325 consists of two hard decision devices (not shown). The first decision device is for the in-phase and another for the quadrature data branches. The term hard decision means that the decision is a level based threshold operation. At the hard decision device, one sampled signal from the sampler block 315 is fed to the decision device 325. If the value of this input signal to the decision device 325 is below a predetermined threshold, the device decides that a logic low is detected. Otherwise, if the value is above a predetermined threshold, a logic high is detected.

FIG. 4 illustrates a block diagram of a feedforward timing estimator 400. The feedforward timing estimator 400 configuration consists of an analog-to-digital converter (ADC) 410, a pulse-shaping filter 415, a processing delay block 420, an interpolation decimation block 425, a decision device 430 and a timing estimator unit 435. The ADC 410 asynchronously samples the received signal at a rate of two or more samples per symbol In feedforward timing estimators due to the asynchronous nature of the sampling, the sampling rate is generally higher than found in feedback configurations. Typically the sampling rate is four or more samples per symbol The sampled output signal from the ADC 410 is fed to a digital pulse-shaping filter 415. The data stream from the pulse-shaping filter 415 is split into two data streams. The first stream is fed to a processing delay block 420, which compensates for the delay in the calculation of the timing offset in the timing estimator unit 435. The second stream is fed to the timing estimation unit 435, where similar to the feedback configuration (FIG. 3) in the timing error detector 320, some algorithm is applied to estimate the timing offset 440 using the received signal samples. The timing offset 440 is then fed to the interpolation/decimation block 425. The interpolation/decimation block 425 has two tasks. First it interpolates the sampled received signal at the instant corresponding to the timing offset 440, then removes the redundant samples in the decimation unit. The decimated output signal is then fed to the decision device 430. The decision device 430 consists of two hard decision devices (not shown) for the in-phase and quadrature data branches of the received signal. When the value of the input signal to the decision device 430 exceeds the threshold, a logic high is detected. Otherwise, if the value is below the threshold of the decision device 430, a logic low is detected.

Figure 5A:
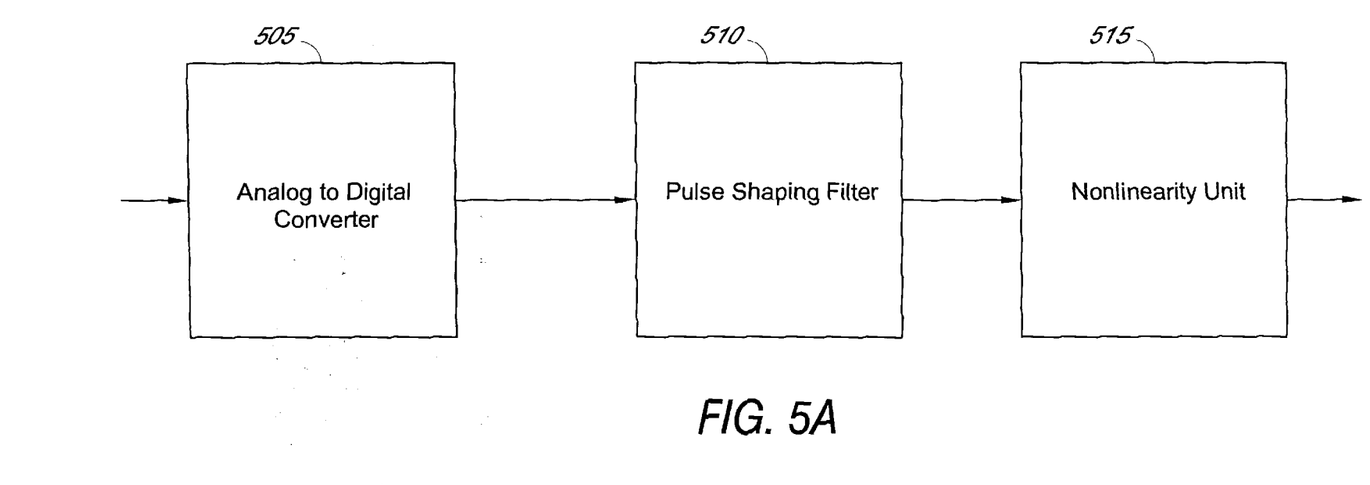
FIG. 5a illustrate a configuration for generation of spectral lines in the frequency domain.
Figure 5B:
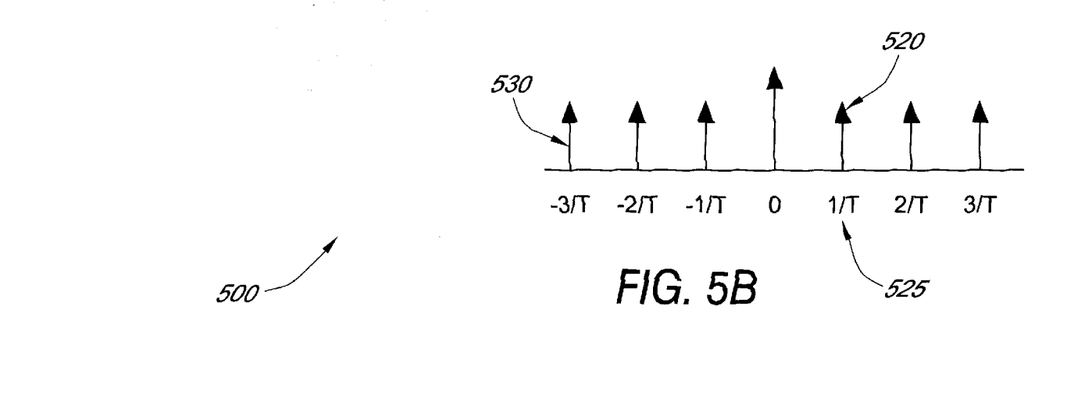
FIG. 5b illustrates the spectral lines formed at the output of a nonlinear operation.

FIGS. 5a and 5b show the generation of the spectral lines in the frequency domain 500, which is the key to spectral line timing estimators. Referring to FIG. 5a, the generation of the spectral lines in the frequency domain 500 comprises an ADC unit 505, a pulse-shaping filter 510 and a nonlinearity unit 515. The ADC unit 505 oversamples the received signal at a rate of four samples per symbol. The output of the ADC 505 is then fed to a digital pulse-shaping filter 510. The pulse-shaping filter output is fed to the nonlinearity unit 515. Any number of nonlinearities can be used, such as square-law, magnitude squared, or quadruple law. In this embodiment the nonlinearity used is the magnitude squared. For a sufficiently large number of transmitted symbols, the process at the output of the nonlinearity is almost cyclostationary in the observation interval. A cyclostationary process is one whose statistical properties vary periodically with time. A cyclostationary process has a Fourier series representation, where the coefficients are random variables with period equal to the inverse of the symbol rate. This is illustrated in FIG. 5b where the coefficients appear as spectral lines 530 occurring at multiples of the symbol rate, where the symbol rate is 1/T. Note that the timing information corresponds to the spectral line 520 occurring at the symbol rate 525. Information concerning the timing offset can be determined by extracting the spectral line at the symbol rate.

Figure 6:
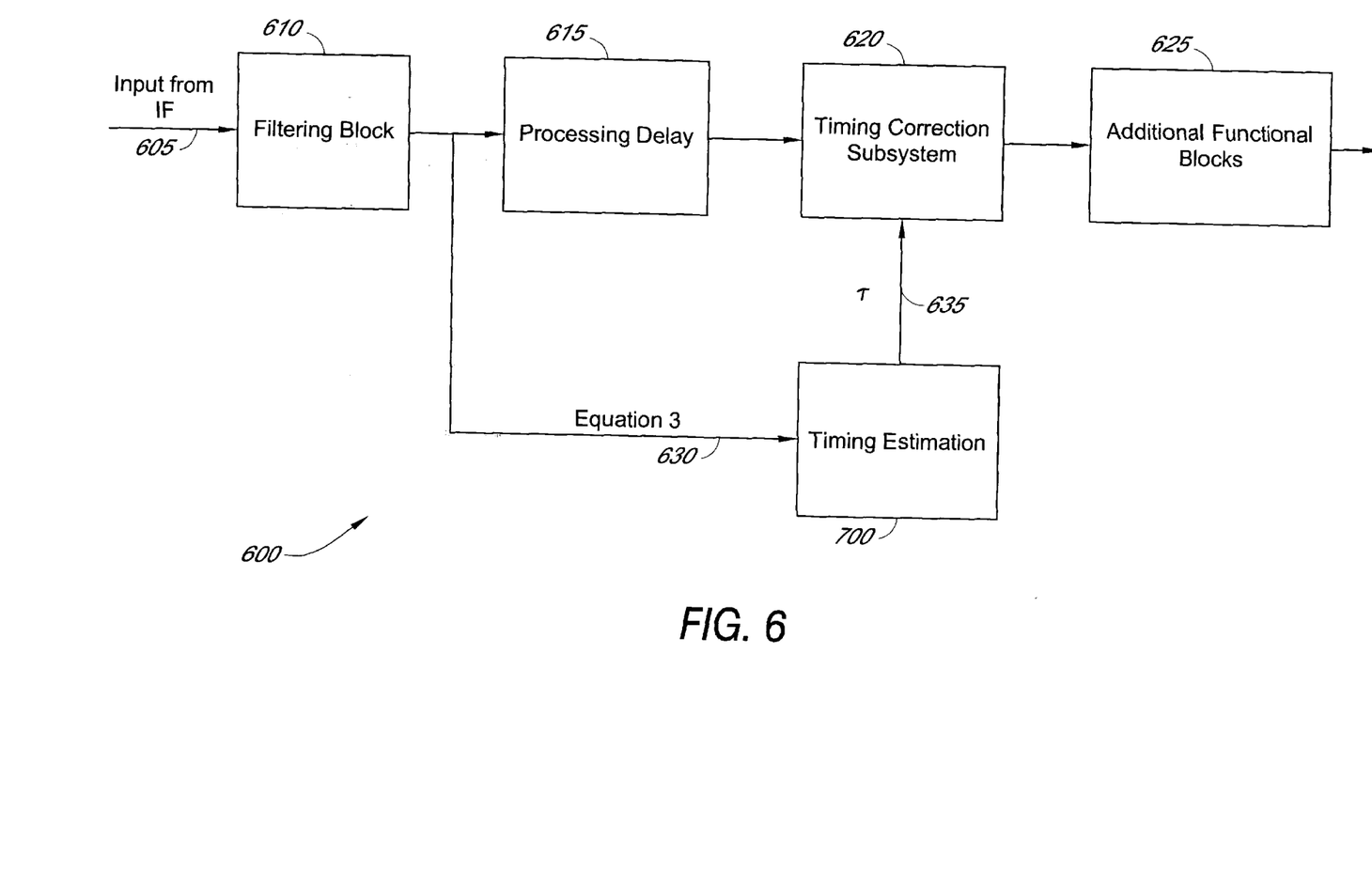
FIG. 6 is a functional block diagram of a baseband subsystem of a digital receiver using the timing estimation system and method as implemented in one embodiment of the invention.

FIG. 6 illustrates a functional block diagram of a baseband subsystem 600 of a digital receiver using the present timing estimation method. The baseband subsystem 600 supports full-duplex voice and data communications. The baseband subsystem could be incorporated into a digital receiver such as shown and described in application Ser. No. 09/093,414, filed Jun. 8, 1998, entitled, "*Joint Maximum Likelihood Frame and Timing Estimation for a Digital Receiver*" and application Ser. No. 08/954,217, filed Oct. 20, 1997, entitled, "Wireless Multimedia Carrier System," which are hereby incorporated by reference. In one embodiment, the baseband subsystem 600 comprises a filtering subsystem 610, a processing delay block 615, a timing correction subsystem 620, additional synchronization subsystems 625 and a timing estimation subsystem 700. The filtering subsystem 610 consists of a pulse-shaping filter. The filtering subsystem 610 receives the data stream 605 from an intermediate frequency (IF) subsystem (not shown) within a wireless communication system. This data stream 605 has already been sampled at the analog-to-digital converter (ADC) with a fixed clock within the IF subsystem. In addition, the IF also contains an anti-aliasing filter to limit the bandwidth of the received signal. This filter is located prior to the ADC.

The sampling rate is four samples per symbol as shown in FIG. 2. The sampled data stream 605 is then fed into the pulse-shaping filter within the filtering subsystem 610. The pulse-shaping filter is preferably matched to the pulse-shaping filter used at the transmitter within the wireless multimedia system (not shown). The pulse-shaping filter within the filtering, block 610 provides optimal performance in the presence of additive white Gaussian noise (AWGN). Furthermore, the pulse shaping, filter is chosen such that the combination of its output and the output of the transmit pulse shaping filter is preferably a Nyquist pulse, that is zero ISI. In other embodiments, the filtering, subsystem 610 may also comprise additional subsystems to a pulse-shaping filter.

The output 630 from the filtering subsystem 610, which is defined by Equation 3 hereinbelow, is then fed into the timing estimation unit 700 to estimate the timing offset τ 635 present on the received sampled signal. The output of the filtering subsystem 610 is also fed to a processing delay 615 which compensates for the delay between the output of the filtering subsystem and the calculation of the timing estimate, which takes place in the estimator 700. The output of the processing delay 615 is fed into the timing correction subsystem 620. The timing correction subsystem 620 comprises an interpolation and decimation circuit, which interpolates the data using the timing offset 635 from the estimator 700. The decimator removes the subsequent redundant samples The timing offset 635 is then fed to the timing correction unit 620 to correctly estimate the data samples corresponding to the generated timing offset. The new data samples are then fed to the additional synchronization and functional units subsystem 625 to remove the effect of additional distortions, which may have occurred in the channel, or to decode the received signal.

Figure 7:
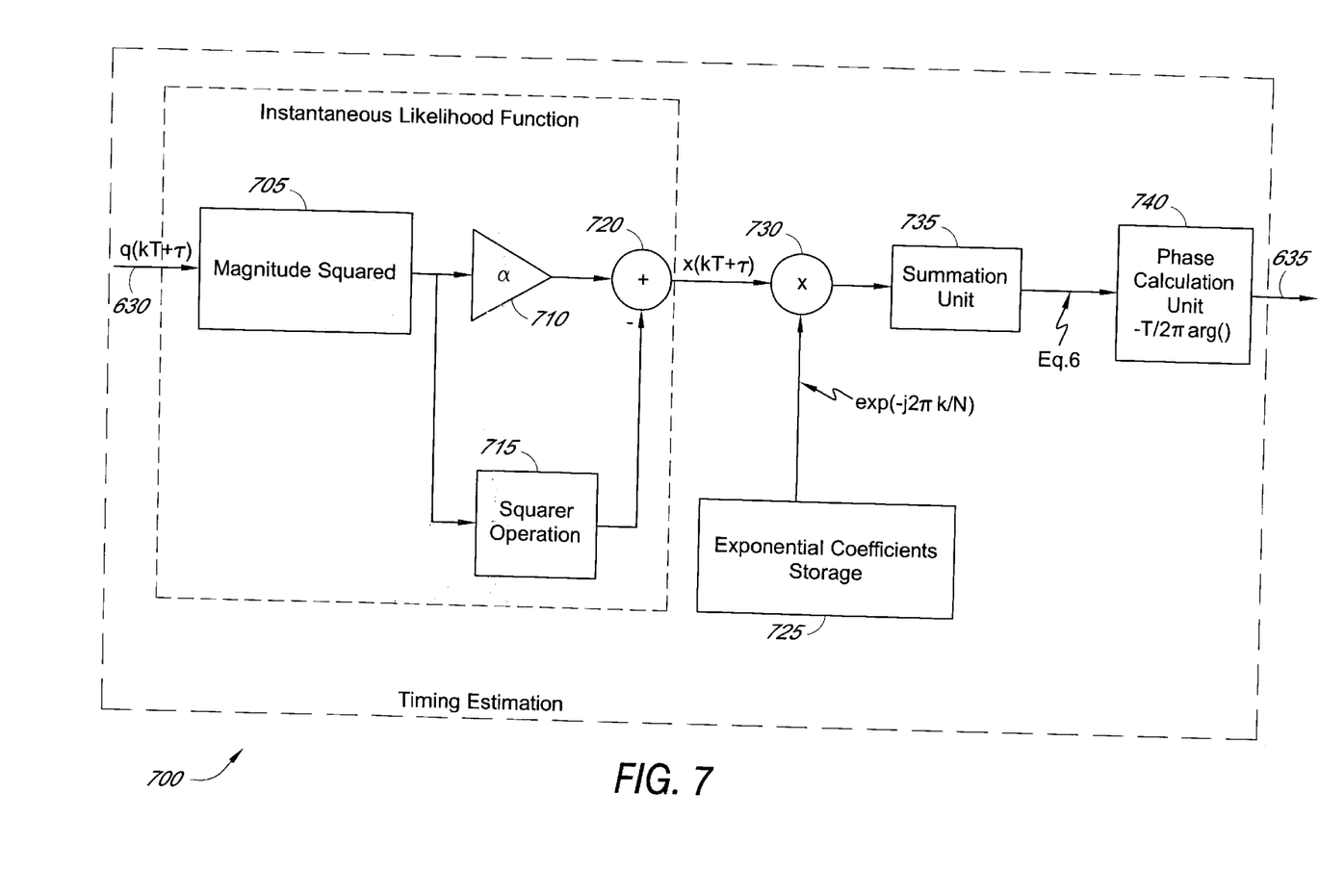
FIG. 7 illustrates a block diagram of the proposed timing synchronization system.

FIG. 7 illustrates a functional block diagram of the timing estimation subsystem 700 used in the baseband subsystem 600. The timing estimation unit 700 comprises a magnitude squaring subsystem 705, a gain unit 710, a squaring subsystem 715, a subtraction operator 720, a generate exponential weights unit 725, a multiplier 730, an accumulator 735 and an angle calculator 740. The output 630 from the filtering subsystem 610 is fed into the timing estimation subsystem 700.

The sampled received signal can be represented as follows, $$r(mT_s) = \sum_k a_k g(mT_s - kT - \tau)\exp(j\phi) + b(mT_s) \qquad \text{Equation 1}$$

Where $r(mT_s)$ represents the received signal sampled at a rate of $mT_s$ following the pulse shaping filter, where the oversampling rate $T_s$ is related to the data rate T as $T_s=T/N$, where $a_k$ is the random transmitted data, g (t) represents the pulse shaping matched filter, T is the symbol rate, τ is the timing offset, b ($mT_s$) represents the sampled AWGN of noise spectral density $N_o$ and $\exp(j\phi)$ represents the exponential phase offset present on the received signal. The baseband received signal is first passed through an anti aliasing filter in the IF section, which is maximally flat over its spectrum so as not to distort the data. In a fully digital receiver implementation, the receiver does not operate on the continuous time received complex envelope but rather on a sampled version of it, taken by a fixed clock, which is asynchronous to the transmitter clock. When the sampling frequency $1/T_s$ is larger than twice the maximum frequency of the signal these samples contain the same information as the continuous time signal. The transmission delay or timing offset 635 is hereafter referred to as τ. Maximum likelihood can be used to estimate the timing offset. ML involves maximizing a likelihood function associated with the received signal over a fixed observation interval. The term observation interval refers to the number of samples over which the averaging of the timing offset takes place. Furthermore, ML assumes the timing offset is deterministic over the observation interval. The maximum likelihood timing estimate is calculated at the instant where the likelihood function in equation 2 is maximized with respect to the timing offset:

$$L(\phi, \hat{\tau}) = \max_{\tau} \sum_{k=mLN}^{(m+1)LN-1} \ln\cosh\left(\operatorname{Re}\left(\frac{q(kT+\tau)}{N_o}\exp(-j\phi)\right)\right) +$$
$$\ln\cosh\left(\operatorname{Im}\left(\frac{q(kT+\tau)}{N_o}\exp(-j\phi)\right)\right), \quad \text{Equation 2}$$

Where LN is the length of the observation interval, and m represents the observation interval counter. The sampled signal at the pulse shaping matched filter output at 610 is represented by:

$$q(KT+\tau) = \int_0^{KT+\tau} r(mT_s) g(mT_s - KT - \tau) dt \quad \text{Equation 3}$$

The natural logarithm of the hyperbolic cosine function is highly nonlinear and must be approximated by some simpler function(s) prior to any implementation of the algorithm. It has been established that a very close approximation to the natural logarithm of the hyperbolic cosine function is as follows where q represents the sampled pulse shaping filter output 610, $$\ln\cosh(q) \approx \frac{q^2}{2} - \frac{q^4}{4}, \quad \text{Equation 4}$$

Typically, however, only the first term of this approximation is used. Note that taking the magnitude of a complex signal removes the effect of the phase of the signal. Therefore, taking the magnitude of the samples at the output of the pulse-shaping filter 610 allows timing estimation to occur without the presence of a phase offset. Replacing the squaring nonlinearity by a magnitude-squared nonlinearity 705 has no effect besides removing the phase offset. In the literature, a magnitude squaring operation is widely used. However, the disadvantage of this technique is that the variance performance may not be sufficient for certain applications. Improved performance is obtained using absolute value or fourth law non-linearities. Alternatively, natural logarithm nonlinearity offers better performance. The proposed algorithm's variance performance is superior to both the square law and absolute value non-linearities without requiring an overly complex implementation structure. The magnitude squaring nonlinearity, as implemented in block 705 forms the magnitude-squared of the in-phase and quadrature samples. The second squaring operation 715 forms the quadrupled sampled filtered signal.

Both block 705 and block 715 comprise a registered squarer, which, in case of the magnitude squared block 705, adds the square of the real and imaginary signal components. The output of the magnitude squared block 705, which corresponds to a real value, is then fed into the squarer operation block 715. Within the squarer block 715, this real value is squared and logically registered. Since both blocks 705 and 715 comprise a logical register, the 710 block contains a logical register so that the outputs from blocks 705 and 715 are synchronized with the clock. A logical registered squarer consists of flip-flops and the logical operation "square", which has been developed in this system. The squarer operation is similar to the multiplication except that it requires less logic.

An amplitude gain factor α is applied at 710, where the optimum value is set to 0.5. This yields to the following approximation, which is adopted in one embodiment of the present invention:

$$\ln\cosh q \approx \frac{1}{2}|q|^2[1-\alpha|q|^2] \quad \text{Equation 5}$$

The scaled squared 710 and quadrupled 715 terms are then subtracted at 720 to form the approximation to the natural logarithm of the hyperbolic cosine function as outlined in equation 4.

This nonlinearity generates an almost cyclostationary process of spectral lines occurring at the symbol rate for a sufficiently large number of transmitted symbols. A cyclostationary process is one in which its statistics repeat with time in a periodic manner. In the prior art, following such a nonlinearity, a bandpass filter or a phase locked loop was used to isolate the component at the clock rate. However, with the advent of digital technology it is now possible to isolate the spectral component at the symbol rate by computing the complex Fourier coefficient at the symbol rate in an instantaneous likelihood function subsystem comprised of blocks 705, 710, 715 and 720. The output of these nonlinearities contains periodic components at the symbol clock frequency, the phase of which is related to the normalized timing offset, $$X_m = \sum_{k=mLN}^{(m+1)LN-1} x(kT+\tau)\exp\left[\frac{-2j\pi k}{N}\right], \quad \text{Equation 6}$$

Where x (kT+τ) represents the signal at the output of the subtractor unit 720. The generation of the Fourier coefficient $X_m$ first requires the generation of the exponential coefficient terms, which are available from block 725 where j is the complex mathematical operator. Once the Fourier component is isolated, the phase of the component remains to be isolated to isolate the timing estimate. The timing estimate (is the output of the timing estimate unit 700) is then fed to the interpolation/decimation unit 620. In one embodiment, the exponential coefficients needed to evaluate the spectral component can be pre-stored in a ROM (Read Only Memory) as illustrated in block 725. Formation of the Fourier coefficients at the symbol rate first requires multiplication of the signal samples from the nonlinearity subsystem with the exponential weights one sample at a time, which takes place at 730. The following formula is used to generate the exponential components:

$$\exp\left[\frac{-2j\pi k}{N}\right] \text{ for } k=0 \text{ to } N-1, \quad \text{Equation 7}$$

During the calculations, for k=0, the value is 1, for k=1, the value is exp[−2jπ/N], . . . and so on. Note that it is periodic, because when k=N−1, the value is equal to 1. The maximum number to be stored in the ROM is N. In one embodiment, since only four samples are needed per bit, four values are stored at a time.

The next stage is to average the samples over a given interval, which depends on the values of the observation interval length LN and the sampling ratio N, to form the spectral component as illustrated in equation 5. Averaging over longer intervals gives an improved estimate of the spectral component. This is performed in the summation unit at 735, for the observation interval defined by equation 6. It then remains to evaluate the phase of the spectral component at the clock frequency to isolate an expression for the timing offset 635 at the unit 740. This is performed in the phase calculation unit 740. In one embodiment the phase calculation unit is implemented as a lookup table that may be stored in a ROM. The address of each spectral component is used to provide the phase calculation. This address is generated by computing the ratio of the Imaginary to Real of the output of the summation block 735. The timing estimate 635 is then fed to the timing correction unit 620 to generate the sample values corresponding to the timing estimate and remove the redundant samples.

In non-data-aided maximum likelihood estimation, the effect of the transmitted data is removed prior to estimation. An exact solution for this type of estimation would require direct calculation of a hyperbolic function of the received signal. Since such a calculation is not computationally feasible, an approximation of the hyperbolic function must be made. One aspect of the present invention is a feedforward timing estimator, which estimates a timing offset by evaluating the phase of the spectral line component at the symbol rate. This spectral component is directly related to the normalized timing offset induced in the channel.

The timing estimator gives an improved performance variance and a lower implementation cost than known designs. With four samples per symbol, the invention uses the squaring and power of four nonlinearities to generate the terms required for timing offset estimation. A timing offset estimate is made by an approximation of the ln cosh function for high signal-to-noise conditions, and adding the absolute value squared of the sampled received signal. Thus, the invention evaluates the complex Fourier coefficient at the symbol rate.

While the above detailed description has shown, described, and pointed out the fundamental novel features of the invention as applied to various embodiments, it will be understood that various omissions and substitutions and changes in the form and details of the system illustrated may be made by those skilled in the art, without departing from the spirit of the invention.

What is claimed is:

1. A timing estimation circuit, comprising:

an instantaneous likelihood function circuit capable of approximating the natural logarithm of the hyperbolic cosine of a sampled filtered signal;

a multiplier receivably connected to the approximation circuit and receivably connected to a source for exponential coefficients and outputting sampled Fourier components;

a summer receivable connected to the multiplier for summing each sampled Fourier component; and a phase calculator receivable connected to the summer to provide a timing offset signal.

2. The timing estimation circuit of claim 1, wherein the instantaneous likelihood function circuit, comprises:

a magnitude squared circuit receiving the sampled filter signal;

an amplifier receivably connected to the magnitude squared circuit;

a squarer circuit receivably connected to the magnitude squared circuit; and a subtractor receivably connected to the amplifier and the squarer circuit to provide the approximated signal.

3. The timing estimation circuit of claim 1, wherein the filtered signal is a despread CDMA signal.

4. The timing estimation circuit of claim 1, wherein the filtered signal is a TDMA signal.

* * * * *